March 9, 1937. W. P. KELLETT 2,072,988
SHOCKPROOF CONTAINER WAGON
Filed Sept. 6, 1935 2 Sheets-Sheet 1
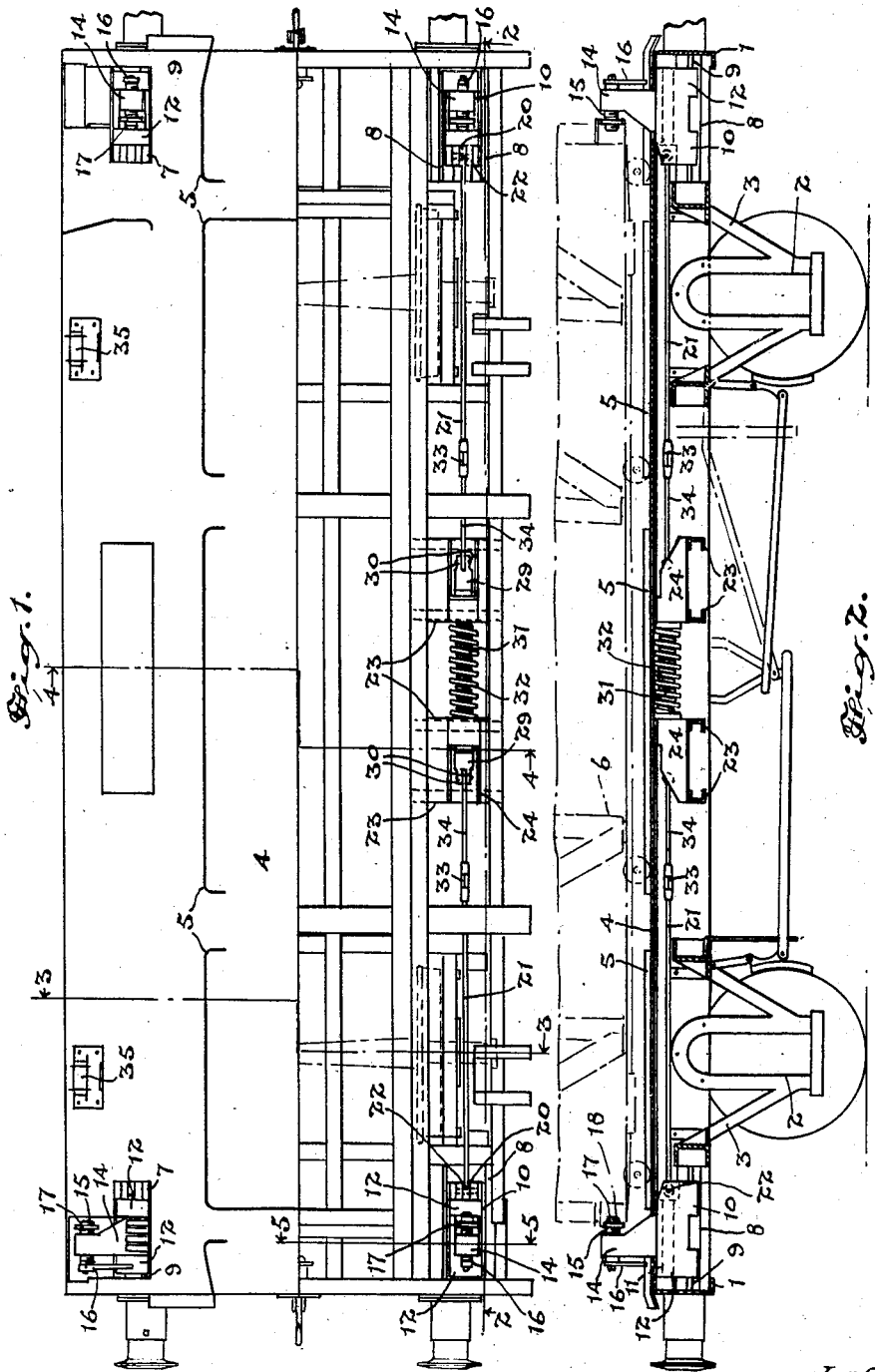
Inventor:
William Platts Kellett.

March 9, 1937.   W. P. KELLETT   2,072,988

SHOCKPROOF CONTAINER WAGON

Filed Sept. 6, 1935   2 Sheets-Sheet 2

Inventor.
William Platts Kellett

Patented Mar. 9, 1937

2,072,988

UNITED STATES PATENT OFFICE 2,072,988

SHOCKPROOF CONTAINER WAGON

William Platts Kellett, Bronxville, N. Y.

Application September 6, 1935, Serial No. 39,404

8 Claims. (Cl. 105—159)

The principal objects of this invention are to provide a structure, particularly applicable to railway wagons or trucks designed to carry removable goods containers, which will materially reduce the effect of impact shocks on the wagon and damage to the goods in the containers, and which will also have a very beneficial effect in relieving both the wagon or truck chassis and the container structure from the detrimental shocks opposed to load inertia.

The principal features of the invention consist in the arrangement upon the wagon or truck body, of jack members slidably mounted and connected together in opposing pairs to engage in locking contact with the opposite ends of a goods container, each connected pair of jacks being resiliently held in a median position and free to move with an endwise movement against an increasing braking resistance.

The preferred form of the device is illustrated in the accompanying drawings in which Figure 1 is a plan view of the wagon, the upper half of which shows the deck of the car and the lower half of which has the deck removed and discloses the under structure.

Figure 2 is a side elevation and part sectional view taken on the line 2—2 of Figure 1 and showing a goods container mounted on the deck between the paired movable jacks.

Figure 3:
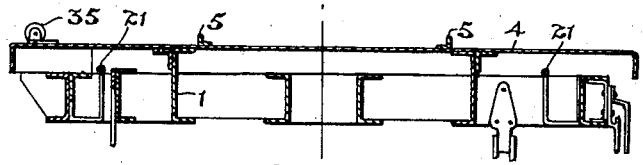
Figure 3 is a cross sectional view of the frame structure of the wagon taken on the line 3—3 of Figure 1.
Figure 4:
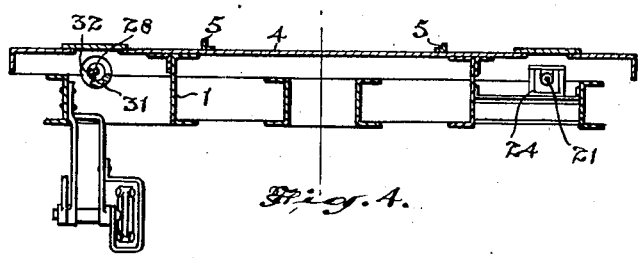
Figure 4 is a transverse sectional view of the wagon structure taken on the line 4—4 of Figure 1.
Figure 5:
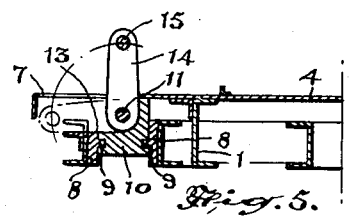
Figure 5 is a cross sectional view of half the frame taken through one of the end jack supports on the line 5—5 of Figure 1.
Figure 6:
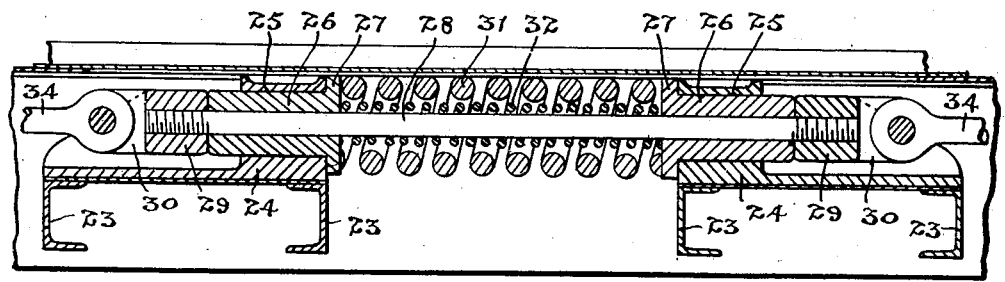
Figure 6 is a sectional view of the cushioning member and its supporting means.
Figure 7:
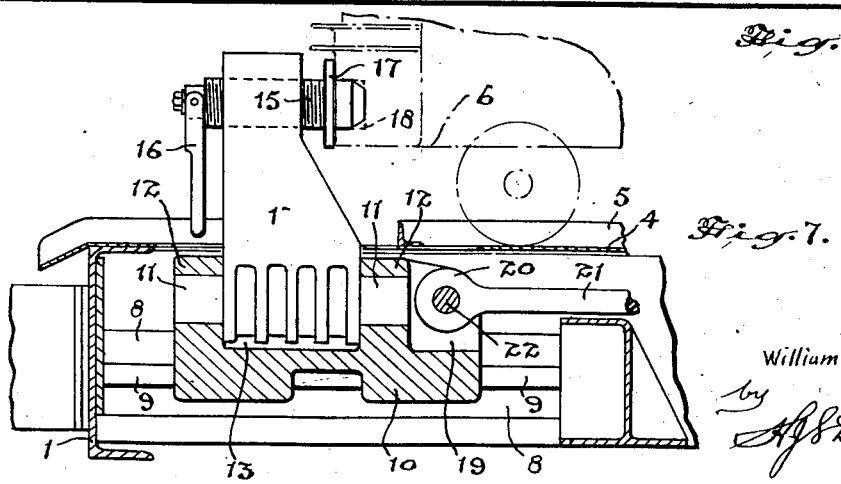
Figure 7 is an enlarged sectional elevation of the jack member and block.

In the transportation of merchandise by railroad or truck considerable damage is done to the goods, particularly where railway wagons are used, as a result of impact shocks and the losses through breakage of goods and damage to equipment are extremely heavy. Recent developments in the handling of merchandise for transportation have brought into use the separate goods containers and many of these are mounted upon wheels or castor supports so that they may be readily moved about, and when such containers are placed upon the wagon or truck they are free to move endwise of the wagon or truck body when endwise impact shocks against such body occur.

It has been proposed to reduce such impact shocks through the medium of spring buffers and the present invention has to do with an improvement in this particular phase of the matter.

In the construction herein illustrated the main frame 1 of the wagon is supported upon suitable bolsters or journal guides 2 from the wheel supports 3.

The deck 4, which is preferably in the form of a metal plate provided with wheel guides 5 to guide the wheels or castors of the containers 6, is also formed with openings 7 preferably at each side and closely adjacent to the end, and supported in the frame beneath each of said openings is a pair of parallelly-spaced guide bars 8, each of which is here shown provided with an inwardly extending rib or flange 9.

Mounted between each of the pairs of guide bars 8 is a block 10 slotted longitudinally to slide on the ribs 9 and having a pivot pin 11 extending from end to end thereof supported in the lugs 12. A socket 13 is formed between the end lugs 12, and rotatably mounted upon the pin 11 and resting within the said socket 13 is a jack member 14 which is adapted to swing to a vertical position in the line of movement of the goods container 6, or to swing downward into the socket formed by the opening in the deck.

The upper or free end of each of the jacks is provided with a horizontal threaded orifice in which is adjustably mounted a threaded jack pin 15 which is preferably provided at its outer end with a pivotal operating wrench handle 16, and the inwardly facing end is formed with a flanged end 17 which is adapted to enter a suitable socket 18 mounted on each end corner of the containers 6.

Each of the slidable jack-supporting blocks 10 is formed with a socket 19 at its inward end in which the eye-end 20 of a rod 21 is secured upon a transverse bolt 22.

Arranged intermediately between the oppositely end paired jack member is a spring buffer device adapted to operate in either direction, that is, from either end.

As herein shown, preferably about centrally of the frame 1, there are arranged a plurality of transverse bars 23, preferably arranged in two pairs, and across each of these pairs and in longitudinal alignment between the opposing end pairs of jack members, are the guide blocks 24, each of which is provided with a longitudinal cylindrical orifice 25.

Cylindrical members 26 each formed with a flanged inner end 27 are slidably mounted one in each of the cylindrical orifices 25, and extending between each opposing pair of the cylindrical members 26, is a rod 28 having secured on each of its threaded ends a block 29 provided with a jaw-shaped pair of lugs 30. Surrounding the rod 28, and extending between the flanged ends 27 of the members 26, are a pair of inter-nested coil compression springs 31 and 32.

The rods 21 connected to the jack blocks 10 are each provided with turn-buckles 33 and extensions 34 which are pivotally secured in the jaw ends 30 of the blocks secured to each end of the rods 28 and it will be apparent that by means of these turn-buckles the effective length of the coupling between the fore and aft jack members may be readily adjusted effecting a relative adjustment of the fore and aft jack members toward or away from each other.

It will be seen that the cylindrical members 26 being slidably mounted in the guide blocks 24, will, upon an endwise movement of the rod 28, press against the springs 31 and 32. Consequently the compression effect of these springs will operate equally from either end, and the rods connected through between the opposing end jack-supporting blocks will operate with a tension pull from either one end or the other against said springs.

When a goods container is placed upon a wagon the jack screws are tightened into position to engage the sockets in the ends, and the connecting rods between the two ends extending through the buffer springs will be drawn taut by the operation of the jack screws.

The blocks 10 are slidably mounted and are held by the rod and spring connections in a mid-longitudinal position on their guides so that when impact shocks occur, the load-carrying containers secured between the opposite end jacks, float on the platform of the car within the opposing limit of the compression springs irrespective of the direction of the shocks, and the jacks retain their rigid clamping contact with the container at both ends.

When the container is to be removed from the wagon, the jack screws from either one or both ends are slackened away to withdraw the flanged end from engagement with the sockets on the containers, and the jacks are then turned down into the recesses provided therefor, and the containers may then be moved either longitudinally or transversely, being mounted upon castor wheels.

Side rollers 35 are provided at the side edges of the wagon to engage special guideways extending transversely beneath the container to assist in the side removal of the containers from the wagon deck.

The construction herein described is extremely simple and provides a resilient floating support for the goods containers which will absorb the impact shocks and thus relieve the containers and the goods contained therein from the resultant stresses of such shocks and the damage to equipment and goods.

What I claim is my invention is:

1. A shock-proof container wagon having a deck on which a container is adapted to movably rest for shock-relief displacement relative to said deck, clamping means displaceable relative to said deck and operatively connected in spaced relation to move positively and uniformly together relative to said deck on fore and aft shock impulse and exerting a positive non-yielding clamping pressure on the container structure placed therebetween, while permitting shock-relief displacement of the container on said deck and cushioning means opposing displacement of each of said clamping means in both fore and aft directions.

2. A shock-proof wagon for containers comprising a vehicle having a deck provided with accommodation for the rolling shock displacement of wheeled containers thereon, means arranged for longitudinal displacement on said vehicle deck and presenting positive clamping contact with the fore and aft ends of a container resting on said deck, means operable to relatively move said clamping means into rigid clamping contact with the fore and aft ends of the container, and spring means common to both fore and aft clamping means resiliently interposed between said longitudinal displacement means and said container-supporting deck to resist endwise movement of the fore and aft clamping means in either direction.

3. A shock-proof wagon having a deck adapted to movably support a container for shock relief displacement thereon, container clamping members mounted fore and aft of the deck for shock-relief displacement relative to the container-supporting deck, said fore and aft clamping members having displaceable operative connection positively retaining the same in rigid clamping relation to the container whereby they must move in unison with the latter on shock displacement of the container on its supporting deck, and cushioning means co-operatively associated with said fore and aft clamping means and serving to normally retain all of said clamping means and the container held thereby in a neutral position on said car deck free for shock displacement in either fore or aft direction in opposition to said cushioning means.

4. A shock-proof wagon for containers having in combination, a deck, container-holding jacks projecting above the deck for clamping contact with a container resting displaceably on said deck for shock-relief displacement, said jacks being displaceable in a fore and aft direction, means for rigidly clamping said jacks against the container structure to move positively therewith as a unit in the shock-relief movement of the container on the deck, said latter means including operative connections between fore and aft jacks housed below the container-supporting deck surface, and means co-operatively interposed between said operative connections and the container-supporting deck for imparting a progressively increasing braking resistance to said jacks and the container clamped therebetween to restrict shock displacement of the container on the said deck.

5. A shock-proof wagon comprising a vehicle, a goods container movably resting for shock displacement on the deck of said vehicle, fore and aft jack members mounted on the vehicle for fore and aft shock displacement relative to the deck on which the container rests and clampingly engaging the ends of said container, means displaceable relative to said deck and positively coupling the opposite jacks together in co-operative relation, whereby said fore and aft jacks are constrained to positively retain their holding clamping relation to the container on shock displacement of the latter on the car deck on which the container rests, and spring means mounted on said vehicle engaging said displaceable jack coupling means to resist endwise movement thereof in either direction.

6. A device as claimed in claim 5 in which the coupling means positively connecting the fore and aft slidably mounted jack members includes means for adjusting the effective length of the coupling by means of which the said fore and aft jack members may be adjusted relatively toward or away from each other.

7. A shock-proof wagon comprising a vehicle having a deck, a goods container movably resting on said deck for shock-relief displacement thereon, blocks slidably mounted fore and aft on the vehicle for fore and aft displacement relative to said deck, said deck directly supporting the weight of the container free of said slidable blocks, jacks pivotally mounted on said sliding blocks and confined against axial displacement thereon, means forming a positive operative coupling between the fore and aft blocks whereby the latter are prevented from individual or independent displacement in their slidable mountings, a compression spring interposed intermediate of the length of said coupling means, and means mounted on said coupling means engaging opposite ends of said compression spring to resist endwise movement of said coupling means and goods container in either direction.

8. A shock-proof wagon comprising a vehicle, a goods container movably mounted on the deck of said vehicle for shock-relief displacement thereon, rigid transverse members arranged in the frame of said vehicle spaced apart, guide members supported by said transverse members and each having longitudinally arranged cylindrical orifices, sleeves slidably mounted in said orifices having flanged ends, a central rod slidably extending through said sleeves, a compression spring encircling said rod between said sleeves, rods connected with said central rod, and clamp members displaceably mounted fore and aft of the said deck and operatively secured to the outward ends of said latter rods to engage and clamp said container, said rods forming a positive spacing means for said clamp means and ensuring a positive clamping of the container between the fore and aft clamps while permitting cushioned shock-relief displacement of the container on said deck.

WILLIAM PLATTS KELLETT.